United States Patent
Kong et al.

(10) Patent No.: US 11,257,491 B2
(45) Date of Patent: Feb. 22, 2022

(54) VOICE INTERACTION FOR IMAGE EDITING

(71) Applicant: Adobe Inc., San Jose, CA (US)

(72) Inventors: Sarah Kong, Cupertino, CA (US); Yinglan Ma, San Jose, CA (US); Hyunghwan Byun, San Jose, CA (US); Chih-Yao Hsieh, San Jose, CA (US)

(73) Assignee: ADOBE INC., San Jose, CA (US)

( * ) Notice: Subject to any disclaimer, the term of this patent is extended or adjusted under 35 U.S.C. 154(b) by 163 days.

(21) Appl. No.: 16/205,126

(22) Filed: Nov. 29, 2018

(65) Prior Publication Data

US 2020/0175975 A1 Jun. 4, 2020

(51) Int. Cl.
| | |
|---|---|
| *G10L 15/22* | (2006.01) |
| *G06F 3/16* | (2006.01) |
| *G06T 11/60* | (2006.01) |
| *G06F 3/0484* | (2013.01) |
| *G06F 3/04845* | (2022.01) |

(52) U.S. Cl.
CPC .......... *G10L 15/22* (2013.01); *G06F 3/04845* (2013.01); *G06F 3/167* (2013.01); *G06T 11/60* (2013.01); *G10L 2015/223* (2013.01)

(58) Field of Classification Search
CPC ............... G10L 15/22; G10L 2015/223; G06F 3/04845; G06F 3/167; G06T 11/60
See application file for complete search history.

(56) References Cited

U.S. PATENT DOCUMENTS

| | | | |
|---|---|---|---|
| 5,864,808 A | * | 1/1999 | Ando ................. G06K 9/033 704/251 |
| 7,075,556 B1 | | 7/2006 | Meier et al. |
| 7,149,957 B2 | | 12/2006 | Hull et al. |
| 7,263,659 B2 | | 8/2007 | Hull et al. |
| 7,263,671 B2 | | 8/2007 | Hull et al. |
| 7,266,782 B2 | | 9/2007 | Hull et al. |
| 7,275,159 B2 | | 9/2007 | Hull et al. |
| 7,492,363 B2 | | 2/2009 | Meier et al. |
| 7,703,002 B2 | | 4/2010 | Barrus et al. |
| 7,739,583 B2 | | 6/2010 | Barrus et al. |
| 7,750,901 B2 | | 7/2010 | Meier et al. |
| 7,779,355 B1 | | 8/2010 | Erol et al. |
| 7,861,169 B2 | | 12/2010 | Hull et al. |

(Continued)

FOREIGN PATENT DOCUMENTS

| | | |
|---|---|---|
| CN | 103093504 | 5/2013 |
| CN | 104331926 | 2/2015 |

(Continued)

*Primary Examiner* — Michelle M Koeth

(74) *Attorney, Agent, or Firm* — Kilpatrick Townsend & Stockton LLP

(57) ABSTRACT

This application relates generally to modifying visual data based on audio commands and more specifically, to performing complex operations that modify visual data based on one or more audio commands. In some embodiments, a computer system may receive an audio input and identify an audio command based on the audio input. The audio command may be mapped to one or more operations capable of being performed by a multimedia editing application. The computer system may perform the one or more operations to edit to received multimedia data.

20 Claims, 14 Drawing Sheets

(8 of 14 Drawing Sheet(s) Filed in Color)

(56) References Cited

U.S. PATENT DOCUMENTS

| | | | |
|---|---|---|---|
| 7,928,976 B2 | 4/2011 | Meier et al. | |
| 8,681,225 B2 | 3/2014 | Levien et al. | |
| 8,964,054 B2 | 2/2015 | Jung et al. | |
| 9,041,826 B2 | 5/2015 | Jung et al. | |
| 9,569,231 B2* | 2/2017 | Butin | G06F 9/453 |
| 9,619,912 B2 | 4/2017 | Bhatnagar et al. | |
| 9,621,749 B2 | 4/2017 | Jung et al. | |
| 9,910,341 B2 | 3/2018 | Jung et al. | |
| 9,942,511 B2 | 4/2018 | Jung et al. | |
| 10,282,057 B1* | 5/2019 | Binder | G06F 3/013 |
| 2006/0170669 A1* | 8/2006 | Walker | H04N 1/00352 |
| | | | 345/418 |
| 2013/0229427 A1 | 9/2013 | Bhatnagar et al. | |
| 2015/0371422 A1* | 12/2015 | Kokemohr | G06T 5/00 |
| | | | 382/311 |
| 2018/0321826 A1* | 11/2018 | Bereza | G06F 3/04883 |
| 2019/0146815 A1* | 5/2019 | Smith, III | G06F 3/0484 |
| | | | 715/706 |

FOREIGN PATENT DOCUMENTS

| | | |
|---|---|---|
| CN | 105894998 | 8/2016 |
| CN | 106502402 | 3/2017 |
| KR | 100374914 | 3/2002 |
| KR | 20020017442 | 3/2002 |
| KR | 20030012466 | 2/2003 |
| KR | 20150040718 | 4/2015 |
| KR | 101577144 | 12/2015 |
| KR | 20180004628 | 1/2018 |
| KR | 20180110017 | 10/2018 |
| WO | WO2017136363 | 5/2017 |

\* cited by examiner

VOICE INTERACTION FOR IMAGE EDITING

TECHNICAL FIELD

This application relates generally to modifying visual data based on audio commands and more specifically, to performing complex operations that modify visual data based on one or more audio commands.

BACKGROUND

As technology improves so do the operations capable of being performed by technology. In many situations, users may not realize, or may not know, how to properly use all of the features of an application. In such situations, a user may not be getting the most out of the application and may discontinue use of the application. In another situation, a user may be a power user of a particular application. In this situation, a user may have to spend a long time utilizing different operations of the application in order to complete a certain task. What is needed is a system that may take, as an input, a natural language input and perform one or more complex operations based on the natural language input. Such a system would aid users in learning of the features of an application and at the same time save power users time when performing complex operations.

BRIEF SUMMARY

Systems, methods, and techniques are provided herein that relate generally to modifying visual data based on audio commands. In one embodiment, a method is provided comprising receiving a first image associated with a photo editing application. The method may further comprise identifying one or more segments within the first image. A segment may be an operable portion of the first image. The method may further comprise receiving a first voice input. The method may further comprise determining, based on the first voice input, a first vocal command. The method may further comprise identifying, based on the first vocal command, a first set of operations for modifying one or more segments within the first image. In one embodiment, the first set of operations may be previously mapped to the first vocal command. The method may further comprise modifying, based on the first set of operations, one or more segments within the first image to generate a modified first image. The method may further comprise causing the modified first image to be displayed in a graphical user interface.

In some embodiments, the method may further comprise receiving a second voice input. The method may further comprise determining, based on the second voice input, a second vocal command. The method may further comprise identifying, based on the second vocal command, a second set of operations for modifying one or more segments within the first image. The method may further comprise modifying, based on the second set of operations, one or more segments within the modified first image. In one embodiment, the first set of operations and the second set of operations may modify at least one of the same segments within the first image.

In some embodiments, the method may further comprise storing, in an operation log, each completed operation of the first set of operations. The method may further comprise causing the operation log to be displayed in the graphical user interface.

In some embodiments, the method may further comprise a first operation for identifying within the first image a first object and the first object is at a first location within the first image. The method may further comprise a second operation for removing the first object from the first location. The method may further comprise a third operation for modifying the first location based at least on a background within the first image. In one embodiment, the background may be a segment of the first image.

In some embodiments, the first set of operations further comprise a fourth operation for placing the first object at a second location. In one embodiment, the second location may be based on a vocal command.

In some embodiments, the method may further comprise identifying, a current operation of the first set of operations. The method may further comprise retrieving, a first visual instruction associated with the current operation, the first visual instructions comprising of visual indicators that instruct a user how to manually perform the current operation. The method may further comprise causing the first visual instructions to be displayed in the graphical user interface.

In some embodiments, the method may further comprise identifying, a current operation of the first set of operations. In one embodiment, the first set of operations may comprise a plurality of sequential operations. The method may further comprise identifying, a next operation of the first set of operations, the next operation being sequentially after the current operation. The method may further comprise retrieving, a second visual instruction associated with the next operation. In one embodiment, the second visual instructions may comprise of visual indicators that instruct a user how to manually perform the next operation. The method may further comprise causing, the second visual instructions to be displayed in the graphical user interface.

BRIEF DESCRIPTION OF THE FIGURES

The patent or application file contains at least one drawing executed in color. Copies of this patent or patent application publication with color drawing(s) will be provided by the Office upon request and payment of the necessary fee.

Features, embodiments, and advantages of the present disclosure are better understood when the following Detailed Description is read with reference to the accompanying drawings.

DETAILED DESCRIPTION

Figure 1:
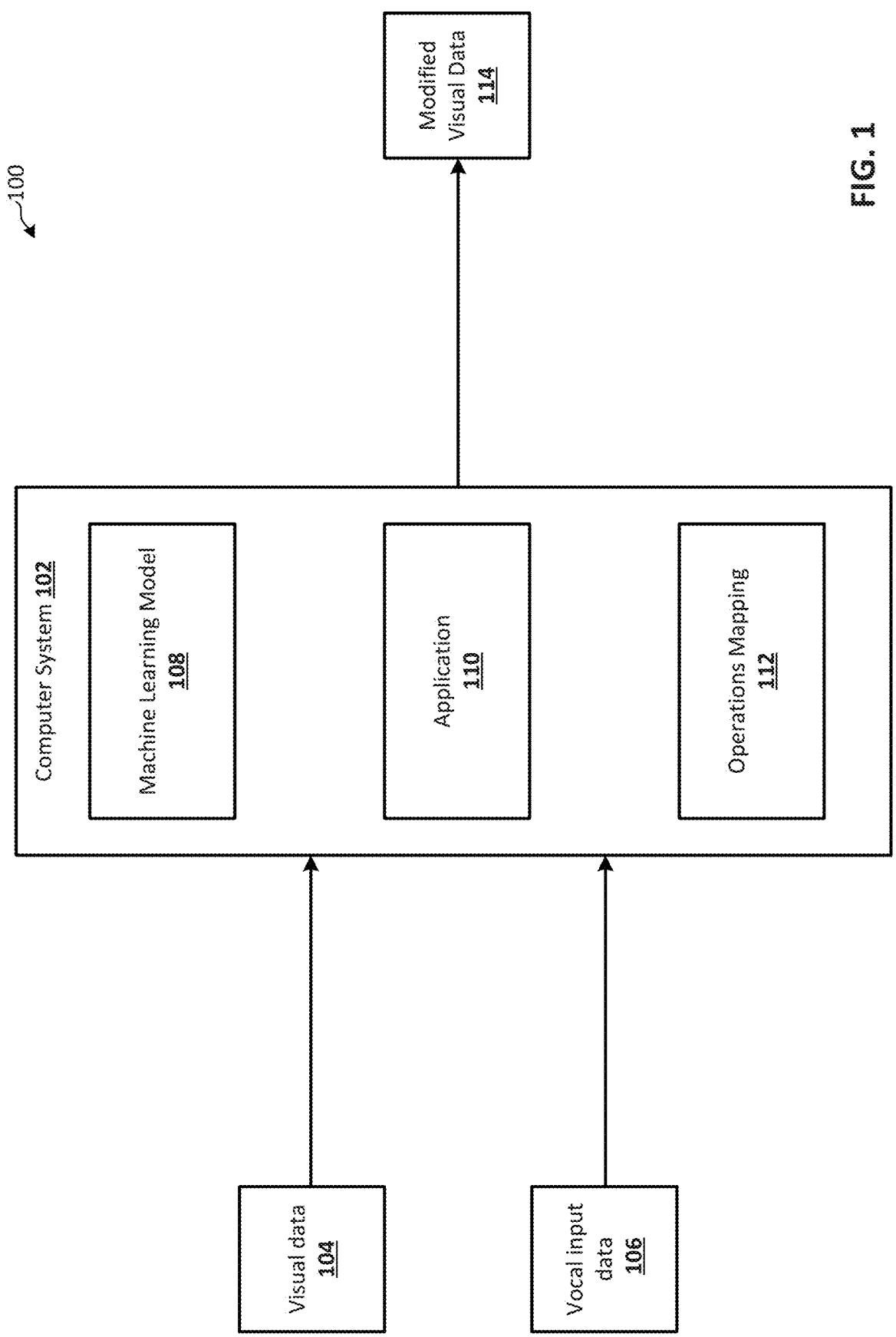
FIG. 1 illustrates a simplified block diagram for implementing one or more embodiments described.

Techniques disclosed herein relate generally to modifying visual data based on audio commands. More specifically, some embodiments relate to performing complex operations that modify visual data based on one or more audio commands. Various embodiments are described herein, including methods, systems, non-transitory computer-readable storage media storing programs, code, or instructions executable by one or more processors, and the like.

One of the many challenges of modifying visual data is the time it may take for a user to perform one or more complex operations to complete a task. For example, photo editing tasks like smoothing the skin of a person in a photo, editing the background of a photo, removing an object from the photo, and the like may require the invocation of several functions and operations within a photo editing application. Thus, the process of, for example, smoothing the skin of a person in a photo may take a relatively long time for even a professional (power) user to perform.

Another challenge of modifying visual data is the voluminous number of tools and operations available to a user of a photo editing application. Photo editing applications may have several tools that a user may utilize in order to customize visual data. However, the sheer amount of options available to the user may be overwhelming to the point where the user may become confused about how to perform certain tasks. Furthermore, many complex tasks such as smoothing the skin of a person in a photo may require several small steps, which may be difficult for a new user to grasp or follow.

According to some aspects of the present disclosure, techniques for modifying visual data based on audio data are disclosed. In one embodiment, an image may be received by a computer system. The image may be associated with one or more photo editing applications that may be executed on the computer system. The computer system may identify one or more segments within the image. A segment may be a modifiable or operable portion of the image. For example, a segment may be a background in the image, one or more objects in the image (such as people, mountains, the sun, the moon, a table, and the like), color levels within the image, brightness levels within the image, contrast levels within the image, shadows within the image, lighting within the image, saturation levels within the image, tones within the image, blurriness within the image, text within the image, layers within the image, and the like. In one embodiment, a segment of an image may be one or more characteristics or properties of the image.

After the segments of the image are identified, the computer system may receive a voice input. The voice input may be a natural language input provided by the user of the computer system. The computer system may convert the natural language input to text and determine one or more vocal commands that are associated with the voice input. In one embodiment, the vocal command is mapped to one or more operations that may be performed by a photo editing application. The computer system, via the photo editing application, may modify the image based on the mapped operations associated with the received voice input.

In one embodiment, one of more operations may request additional voice input from the user. The additional voice input request may be a request for the user to specify one or more aspects of one or more operations. For example, a first voice input may be "move the dog in the image." In response, the computer system may modify the image to first remove the dog from the image (i.e., performing a first part of a set of operations associated with the first voice input) and then generate an additional voice input request of "where would you like to move the dog to?" In response, a user may present, to the computer system, a second voice input of "to the left of the person." In response, the computer system may modify the image to paste the dog to the left of the person in the image and fill in the space left by the dog's original location (i.e., performing a second part of a set of operations associated with the first voice input subsequent to receiving the second voice input).

In some embodiments, there may be one or more visual instructions associated with one or more operations mapped to a vocal command. The visual instructions may indicate text and images that may be displayed, via a graphical user interface associated with a photo editing application, to the user, before, during, or after the computer system performs one or more operations. The visual instructions may indicate to a user how to manually perform an associated operation. In one embodiment, the visual instructions may provide a user an alternative to performing an associated operation, or different ways to manually perform the associated operation.

The techniques disclosed herein may be an improvement to image editing technology and to computer systems themselves. In one embodiment, the complex set of operations associated with an audio input may be unavailable via manual operation. For example, an audio command to "smooth the skin" may represent a complex set of operations, but there may be no way to automatically invoke the commands mapped to the "smooth the skin" audio command without using audio commands (i.e., not hard or soft key "shortcut"). In such an example, the audio inputs may allow for the automation of sequential operations of an application, which may increase the efficiency of image editing technology and computer systems themselves. In one embodiment, the complex set of operations may be determined by one or more machine learning algorithms. In such an embodiment, the computer system may record the operations and processes performed by users to determine and/or modify the complex set of operations associated with one or more tasks. The machine learning algorithm may improve image editing technology and computer systems themselves by determining the most efficient way to complete a particular task (e.g., skin smoothing, masking a background, or another process).

The techniques disclosed herein may be an improvement to application accessibility. In one embodiment, the complex set of operations associated with an audio input may be accompanied by instructions that may aid a user in manually implementing one or more operations within the complex set of operations. In such an embodiment, users may be informed how to efficiently use one or more features of an application.

The following examples are provided to introduce certain embodiments. In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as an "example" is not necessarily to be construed as preferred or advantageous over other embodiments or designs.

FIG. 1 illustrates exemplary system 100 for implementing one or more embodiments described. System 100 comprises computer system 102, visual data 104, vocal input data 106, and modified visual data 114. Computer system 102 may comprise machine learning model 108, application 110, and operations mapping 112. Computer system 102 may take as inputs visual data 104 and vocal input data 106 and computer system 102 may output modified visual data 114. Computer system 102 may be implemented by one or more processors and one or more non-volatile sets of memory. Computer system 102 may be implemented by a mobile device, a mobile phone, a tablet, a laptop, and the like. In one embodiment, computer system 102 may operate in a cloud-based environment. In such an embodiment, all or one or more components of computer system 102 may be implemented within a server that is connected to one or more user devices via an Internet or other suitable connection. In a cloud-based environment a user device may transmit to computer system 102, via the Internet or other suitable connection, visual data 104, vocal input data 106, and receive from computer system 102 modified visual data 114. The user device may display, via a display, visual data 104 and/or modified visual data 114.

Visual data 104 may be one or more types of visual data and associated metadata. In one embodiment, visual data 104 may include an image, a video, multimedia content, a web page, an augmented reality environment, a virtual reality environment, and the like. Visual data 104 may include metadata such as the time the visual data was created, a device that captured or generated the visual data, one or more applications that the visual data is compatible with, an indication of the size of the visual data, and the like. Visual data 104 may be displayed by a user device such as a mobile phone, a mobile computer, a laptop computer, a desktop computer, a tablet, and the like. Visual data 104 may be displayed by computer system 102 via a display coupled to computer system 102.

Vocal input data 106 may be data that indicates an audio-based input. In one embodiment, vocal input data 106 may be voice data associated with a user's audio input. The voice data may be received and converted to text via one or more speech-to-text algorithms. In one embodiment, the user's audio input may be converted by an external system prior to being implemented by computer system 102. In such an embodiment, vocal input data 106 may contain text that is representative of a user's audio input. For example, an external voice assistant system such as Amazon's Alexa®, Apple's Siri®, and the like may be implemented by computer system 102 to convert a user's audio input into text. In such an embodiment, the external voice assistant may convert the user's audio input from speech to text and vocal input data 106 may be the resulting text.

Machine learning model 108 may comprise a plurality of machine learning models and algorithms. In one embodiment, the machine learning algorithm may be a supervised learning algorithm or an unsupervised learning algorithm. The machine learning algorithm may be a classification, regression, clustering, decision tree learning, association rule learning, artificial neural network, inductive logic programming machine learning algorithm, and the like. Machine learning model 108 may be trained based upon training data. The training data may comprise previous user actions for performing certain tasks. A task may require performing one or more operations associated with an application. For example, several users may perform, via an application, one or more operations that result in a background being removed (e.g., a task). In such an example, each user may perform different operations to come to the same result. The operations utilized by users may be part of training data for training machine learning model 108, such that machine learning model 108 may determine the most efficient and/or best way for completing one or more tasks associated with an application. Other tasks may include moving an object included within visual data 104, removing an object included within visual data 104, smoothing the skin of a person within visual data 104, modifying a background included within visual data 104, and the like.

Application 110 may be a visual data editing program. In one embodiment, application 110 may be implemented by Adobe's Photoshop® or another visual data editing program. Application 110 may be capable of performing one or more set of operations, based on visual data 104 and vocal input data 106, that modify visual data 104. In one embodiment, application 110 may receive a user's audio input and determine vocal input data 106 based upon the user's audio input. Application 110 may generate a graphical user interface that displays visual data 104 and modified visual data 114. The graphical user interface may be displayed via a display associated with computer system 102.

Operations mapping 112 may comprise mappings between one or more operations capable of being performed by application 110 and one or more vocal commands associated with vocal input data 106. Vocal input data 106 may be associated with one or more vocal commands within operations mapping 112. For example, vocal input data 106 may be the text or audio "Remove this item" and this may correspond to vocal command "remove a segment indicated by a multi-model input." The vocal command (i.e., a task) may be mapped to one or more operations capable of being performed by application 110. The vocal command and one or more operations associated with the vocal command may be further defined by the multi-model input, such as, a mouse click, selecting a graphical user interface and the like. One or more operations may be a set of sequential operations for completing a task. In one embodiment, the one or more operations associated with a particular task may be determined by machine learning model 108. In one embodiment, an external voice assistant may convert a user's audio input from speech to an intent and the intent may be the vocal command. In such an embodiment, the external assistant may recognize operations mapping 112 and determine a vocal command from user's audio input.

In one embodiment, one or more operations associated with a particular task may be unavailable to be manually invoked by a user of application 110. For example, a particular task may be removing an object from an image. This task may include several mapped operations, which may include: first, automatically identifying segments within an image, second, identifying a segment that corresponds to the object, third, removing the segment from the image, and fourth, filling in the area left by the removed segment. In one embodiment, the operation of identifying segments within an image may not be able to be manually invoked by a user of application 110. In such an embodiment, the user may be responsible for manually identifying one or more segments within an image. In addition, outside of mapped operations associated with a task, there may not be a manual operation that automatically fills in blank portions in the image. Instead, the user may have to manually paint (modify in some other way) the portion of an image left blank by a removal of a segment. Thus, in some embodiments, certain operations may be available only via audio command.

Operations mapping 112 may further comprise visual instructions associated with each applicable operation capable of being performed by application 110. Each applicable operation may be an operation that is capable of being performed manually by the user. The visual instructions may comprise text and or images that may be superimposed into displayed visual data 104 that may indicate how to manually perform one or more operations. For example, the operation of selecting, via a quick selection tool, an object within an image that may have corresponding visual instructions that may visually indicate (e.g., by an arrow, circle, and the like) an area within the graphical user interface that the user can engage to select the quick selection tool. In such an example, the visual instructions may further include text that explains functionality associated with the quick selection tool such as "the quick selection tool may be utilized to highlight and subsequently select one or more portions of an image!" In one embodiment, visual data 104 may be displayed to a user via a graphical user interface and as each operation is performed to modify visual data 104 corresponding visual instructions may be superimposed into the graphical user interface such that a user may "follow along" with the operations mapped to a particular task. In one embodiment, visual instructions may be displayed for a past operation, the current operation, or the next operation. In one embodiment, visual instructions may be displayed once a particular task has been completed and the user may be able to navigate the visual instructions to determine how to manually invoke the operations to complete the particular task.

Operations mapping 112 may include mapping to other applications aside from application 110. For example, one or more operations within operations mapping 112 may invoke multiple applications. In such an example, one or more operations may invoke application 110 to, for example, edit visual data 104, and one or more operations may invoke, another application to, for example, post modified visual data 114 to a website. In another example, one or more operations may invoke application 110 to, for example, edit visual data 104, and one or more operations may invoke another application to, for example, compress or encrypt one or more aspects of modified visual data. Operating mapping 112 may be stored in non-volatile memory within or external to computer system 102.

Modified visual data 114 may be visual data that has been modified by computer system 102. In one example, modified visual data 114 may be the result of one or more parts of computer system modifying visual data 104 based at least on vocal input data 106. Modified visual data 114 may be a visually modified version of visual data 104. For example, a background within visual data 104 may be modified to generate modified visual data 114. Modified visual data 114 may be displayed by a user device such as a mobile phone, a mobile computer, a laptop computer, a desktop computer, a tablet, and the like. Modified visual data 114 may be displayed, via a display, coupled to computer system 102.

Figure 2:
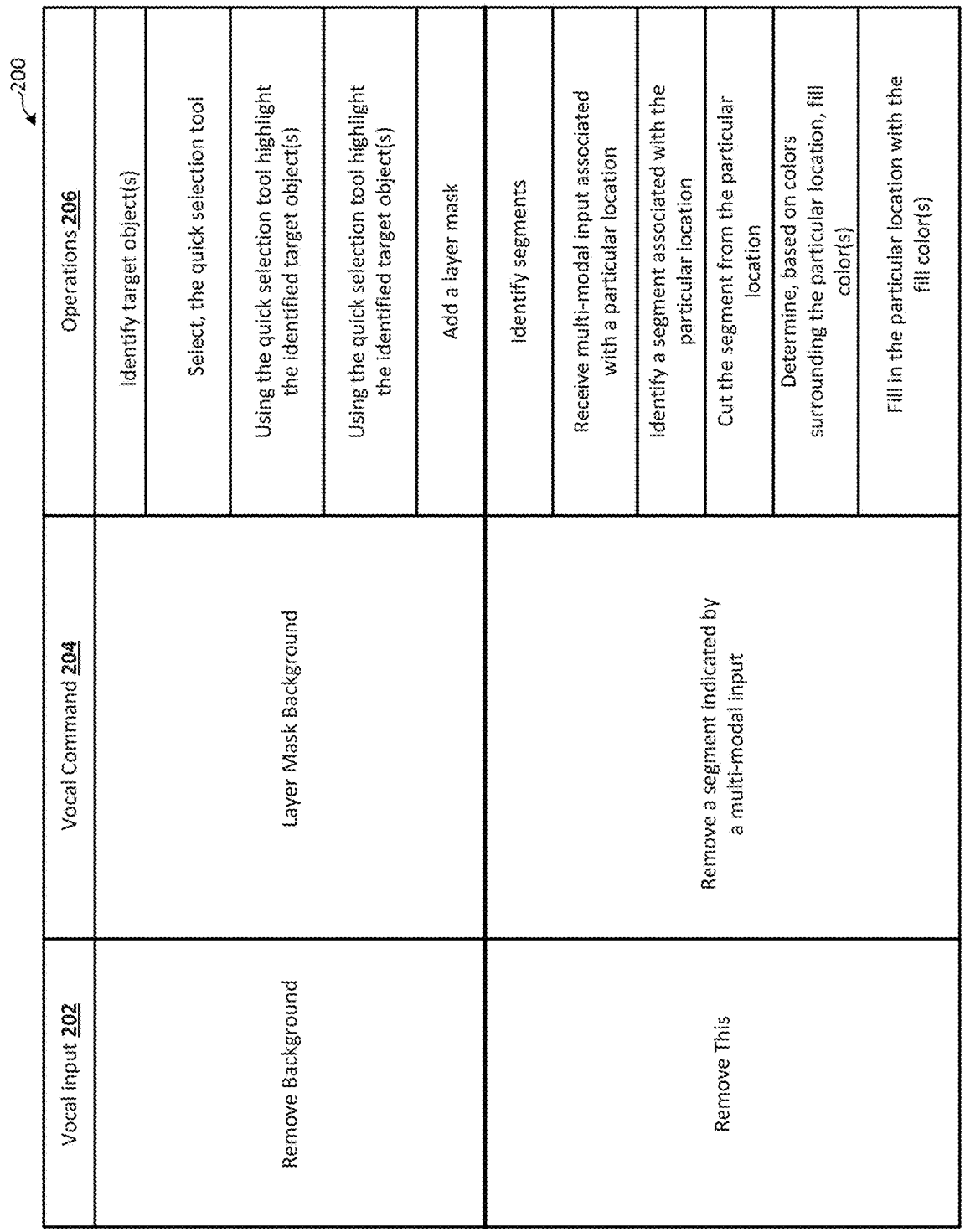
FIG. 2 illustrates an example of operations mapping for implementing one or more embodiments described.

FIG. 2 illustrates exemplary operations mapping 200. Operations mapping 200 may comprise vocal input column 202, vocal command column 204, and operations column 206. Vocal input column 202 may comprise text associated with a user's audio input. A user's audio input may be converted to text and the text may be matched to an entry in vocal input column 202. For example, a user's audio input may be "remove background." In such an example, the user's audio input would be converted into the actual text of "remove background." Then, a computer system may query operations mapping 200 to determine if there is an entry within vocal input column 202 that matches the received text. In one embodiment, the text of the user's audio input may not have to exactly match an entry in vocal input column 202. For example, a user's audio input may be "remove the background in this image." In such an example, the user's audio input would be converted into the actual text of "remove the background in this image." Then, a computer system may query operations mapping 200 to determine if an entry within vocal input column 202 matches, within a certain threshold, the received text. The computer system may determine the entry of "remove background" corresponds to the received input because 100% of the ordered words within an entry in the vocal input column 202 appear within the received text. That is, the words "remove" and "background" appear in the received text, and the word "remove" precedes the word "background" in the received text. A variety of similarity engines and algorithms may be utilized such that a received text associated with a user's audio input can be matched, within a certain certainty, to an entry in vocal input column 202.

Vocal command column 204 may comprise text that associates an entry in vocal input column 202 to one or more operations in operation column 206. An entry in vocal command column 204 may be mapped to an entry in vocal input column 202. Furthermore, each entry in vocal command column 204 may be mapped to one or more operations in operation column 206. In one embodiment, multiple entries in vocal command column 204 may be mapped to a single entry in vocal input column 202. For example, an entry in vocal input column 202 may be "remove and fill background." Such an entry may be mapped to both a "layer mask background" and a "fill a segment" entry in vocal command column 204. In one embodiment, vocal input column 202 and vocal command column 204 may be combined, such that a vocal input itself is mapped to one or more operations. In one embodiment, an entry in vocal command column 204 may be referred to as a task. In instances where vocal command column 204 is omitted an entry in vocal input column 202 may be referred to as a task.

Operations column 206 may comprise one or more operations that are associated with an entry in vocal command column 204. The one or more operations may be referred to as a set of operations or a set of complex operations. The one or more operations may be operations capable of being performed by one or more applications. In one embodiment, the one or more operations may be executed in sequential order.

FIG. 2 illustrates operations associated with the vocal command "layer mask background" and the vocal command "remove a segment indicated by a multi-modal input." In one embodiment, when the vocal command "remove segment indicated by a multi-modal input" is selected, based on a user's audio input, then the following operations may be performed by an application. First, the application may identify segments with an image. Second, the application may receive a multi-modal input associated with a particular location. The multi-modal input may be associated with a user gesture, such as a touch (or a mouse click) of a physical location on a display associated with the user device or a computer system running the application. Third, the application may identify a segment associated with the particular location. The particular location may be associated with a particular identified segment such as the background in the image, a person in the image, an animal in the image, etc. Fourth, the application may cut the segment from the particular location. A cut function may simply remove the segment and save the segment to temporary memory. This may be useful if the user later decides to place the removed segment elsewhere in the image. Fifth, the application may determine, based on colors surrounding the particular location, fill colors. The application may determine, based one or more color values, saturation data, hue data, color data, and the like of pixels surrounding the particular location, one or more fill colors that can be used to fill in the particular location to make the particular location appear to be visually unmodified. Sixth, the application may fill in the particular location with the determined fill color(s). The application may fill in the particular location using one or more fill, brush, or paint operations. In one embodiment, the application may utilize one or more processes (e.g., "Content Aware Fill" process) to fill in areas with pixels from other parts of a given image or fill in areas with pixels sampled from another image.

Figure 3:
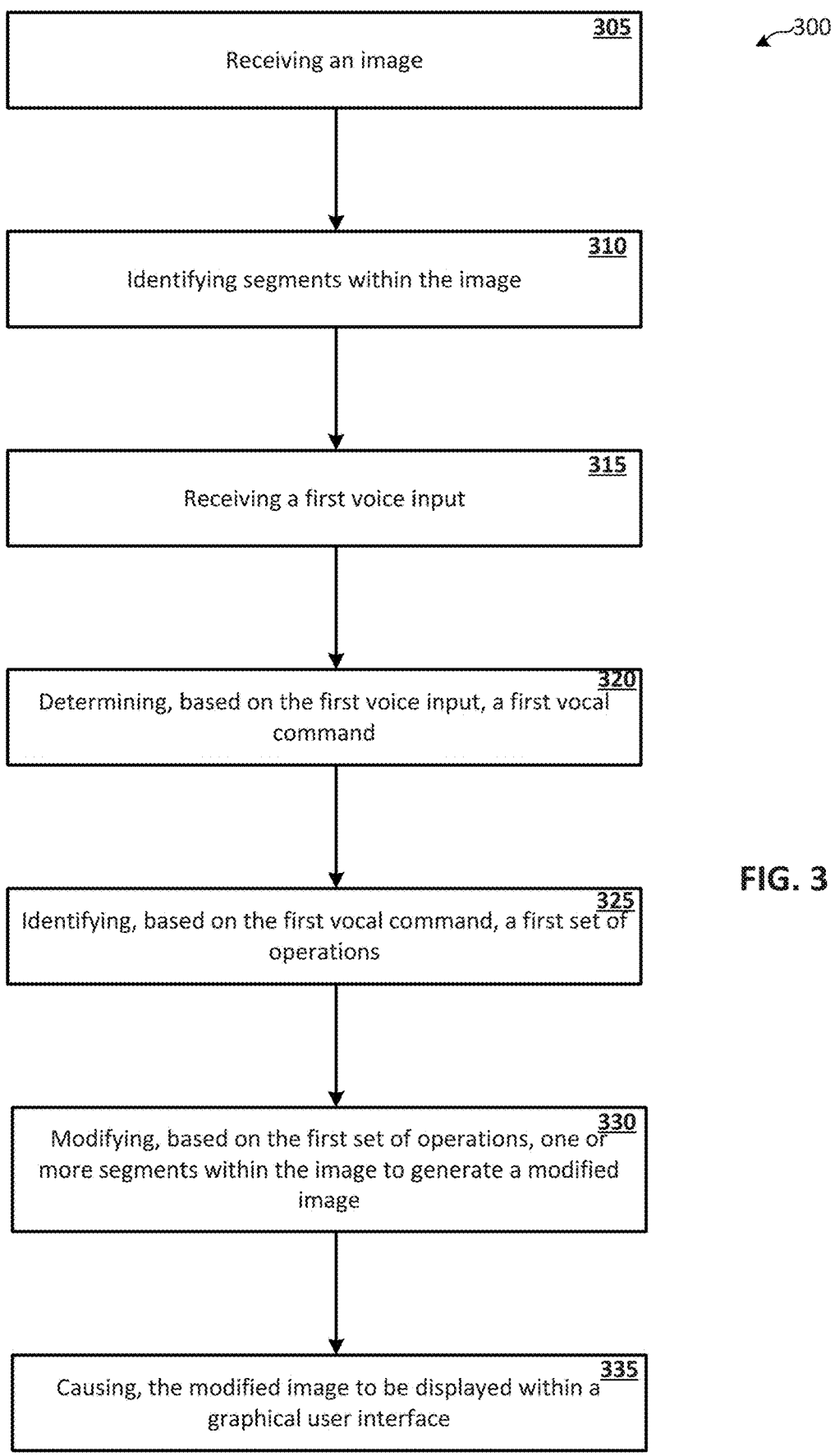
FIG. 3 illustrates an example process for implementing one or more embodiments described.

FIG. 3 illustrates process 300 for implementing one or more embodiments. Process 300 may be a process for modifying an image based on a voice input. Process 300 may be performed by a computer system. At 305, a computer system receives an image. The image may be in different forms such as, but not limited to: Joint Photographic Experts Group (JPEG), JPEG 200, Exchangeable Image File Format (EXIF), Tagged Image File Format (TIFF), Graphics Interchange Format (GIF), Better Portable Graphics (BPG), Adobe Photoshop (PSD), and the like. In one embodiment the received image may also have associated image metadata. The image metadata may include a date the image was created, a device identifier that identifies the device that generated the image, dots per inch (DPI), focal depth, keywords related to the image, captions, subtitles, titles, licensing information, restrictions, digital media rights, and the like. Upon receiving the image, the computer system may cause the received image to be displayed on an associated display. An associated display may be a display linked to the computer system or a display linked to a user device that is coupled, via an Internet or other suitable connection, to the computer system. In one embodiment, a photo editing application may be implemented by the computer system to display within a graphical user interface the received image.

At 310, the computer system identifies segments within the received image. A segment may be a modifiable or operable portion of the image. For example, a segment may be a background in the image, one or more objects in the image (such as people, mountains, the sun, the moon, a table, and the like), color levels within the image, brightness levels within the image, contrast levels within the image, shadows within the image, lighting within the image, saturation levels within the image, tones within the image, blurriness within the image, text within the image, layers within the image, and the like. The segments may be identified by one or more image recognition algorithms. In one embodiment computer vision and associated computer vision algorithms may be utilized to determine segments within an image. In one embodiment, once the segments are identified a corresponding label may be generated for each segment that may identify the segment. For example, if a segment is identified that is a person, the segment may be labeled as "person 1." The computer system may use prior instances of particular items to determine a label of a segment. For example, the computer system may have several images of cats stored in a database and may leverage these images to determine if an identified segment appears to be a cat. The computer system may use a machine learning model to label identified segments within the image. In one embodiment, the received image may have various segments already indicated in, for example, image metadata. In such an embodiment, the computer system may reference the image metadata to identify one or more segments within the image.

At 315, the computer system receives a first voice input associated with a user. The first voice input may be audio initially generated by a user of the computer system. The user, via an audio input device, such as a microphone, may generate the first voice input. In one embodiment, the computer system or an external device may receive the first voice input and convert the first voice input into text.

At 320, the computer system determines, based on the first voice input, a first vocal command. A vocal command may be a task that can be completed based on an associated set of operations. For example, a task may be "layer mask background" or "fill a segment" as these are tasks that are capable of being completed based on a set of operations. A vocal command may differ from a first voice input in that a first voice input may comprise natural language instead of tasks. For example, a voice input may be "Please remove the background." There may be no task entitled "please remove the background", but there may be a task entitled "layer mask background" which results in the background being removed. By implementing both voice input and vocal commands, the computer system allows tasks to be determined based on natural language input instead of requiring the user to have knowledge of each task internal to the computer system.

At 325, the computer system identifies, based on the first vocal command, a first set of operations. Each vocal command within the computer system may have a set of operations associated with it. These set of operations may be a sequential ordering of operations that may be performed in order to complete a task. The operations within the set of operations may be required to be performed in sequential order or they may be performed in parallel. The operations may be performed by one or more applications being executed by the computer system.

At 330, the computer system modifies, based on the first set of operations, one or more segments within the image to generate a modified image. The computer system, via one or more applications (e.g., a photo editing application, multimedia editing application, and the like), may modify the image based on the first set of operations. In one embodiment, the received image may be displayed, via a graphical user interface, prior to and during the modification process. For example, the computer system may perform the first operation in the first set of operations which may cause a change to the received image within the graphical user interface. By displaying the image during the modification process the user may see what operations are being performed and how each operation modifies the image. The computer system may invoke different applications to perform one or more operations within the set of operations. After the first set of operations have been performed then a modified image is generated.

At 335, the computer system causes, the modified image to be displayed within a graphical user interface. In one embodiment, the received image and subsequent modified image may be displayed during the images modifications. In one embodiment, only after the first set of operations are completed is the modified image displayed. The modified image may be displayed within a graphical user interface, via an associated display. The associated display may be connected to the computer system. In one embodiment, the computer system may be in a cloud-based computing environment. In such an embodiment, the computer system may receive an image from a remote user device and modify the image to generate the modified image and may transmit to the remote user device the modified image and the remote user device may display via an associated display, the modified image.

Figure 4:
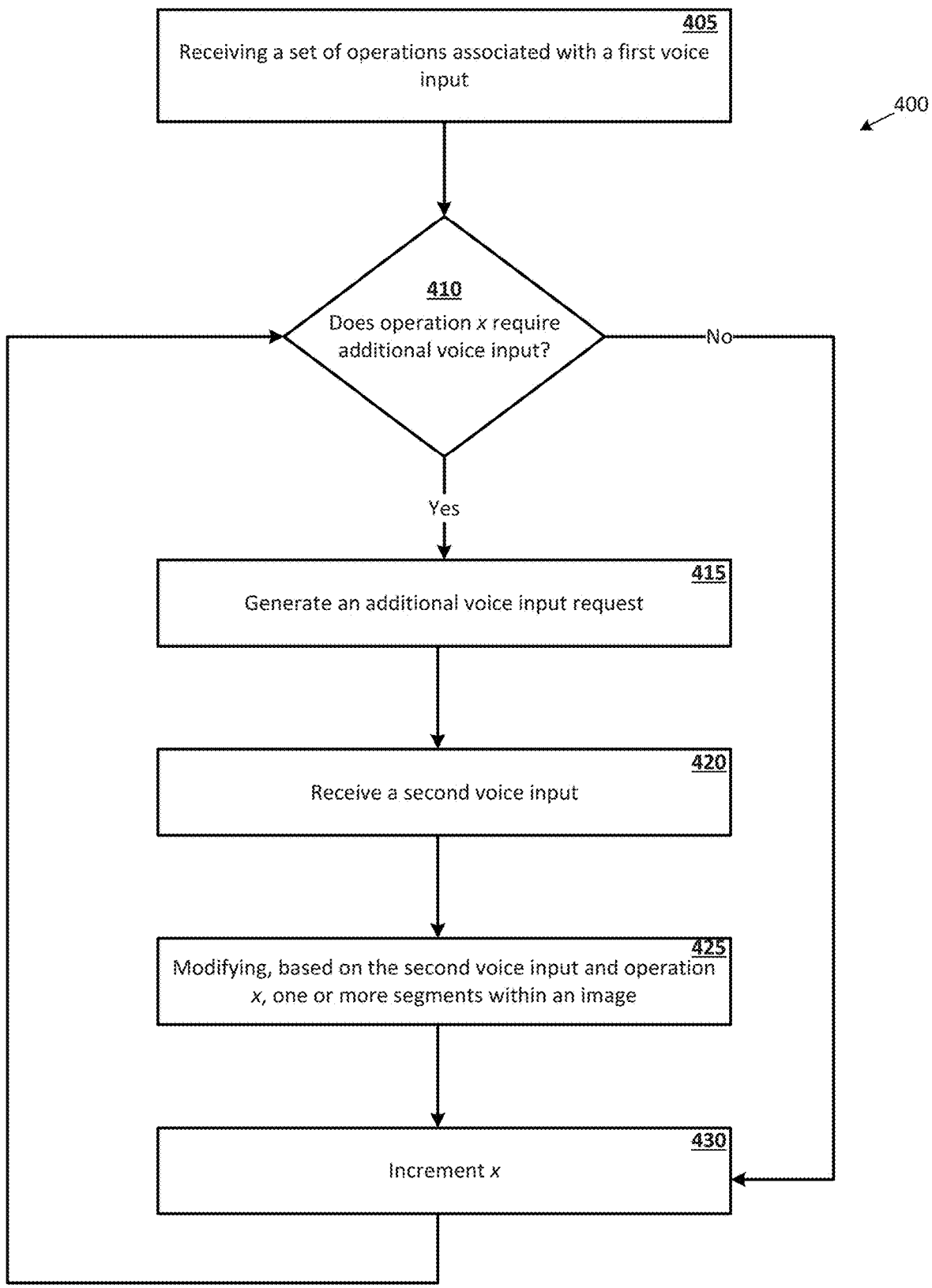
FIG. 4 illustrates an example process for implementing one or more embodiments described.

FIG. 4 illustrates process 400 for implementing one or more embodiments. Process 400 may be a process for modifying a received image based on a second voice input. Process 400 may be performed by a computer system. At 405, the computer system receives a set of operations associated with a first voice input. The computer system may modify segments within an image based on the set of operations associated with the first voice input. The first voice input may be a user's audio input that may correspond to a task that may be completed by performing the set of operations. For example, a task may be removing a background from an image. The computer system may receive the set of operations in response to a query into an operations mapping database.

At 410, the computer system determines if operation x requires additional voice input. Operation x is an operation in the set of operations. In one embodiment, in order to perform one or more operations within the set of operations, additional voice input may be requested. The additional voice input may specify one or more parameters associated with an operation. For example, a voice input may be "change the background." However, to perform this task, the computer system, via an application, may need additional information such as how the user would like to change the background. In one embodiment, additional voice input may be requested at the end of an operation or a task to determine a user's satisfaction. For example, a task may be to brighten the image and at the conclusion of the operations needed to brighten the image, the computer system, via an application, may request additional information to determine if the user approves of the result. If the user does not approve, then one or more additional operations may be performed to attempt to correct the problem. If no additional voice input is required by operation x, then process 400 moves to 430. However, if additional voice input is required by operation x, then process 400 moves to 415.

At 415, the computer system generates an additional voice input request. The additional voice input request may request a user to provide additional voice input in order to determine one or more parameters associated with an operation. For example, a first voice input may be "change the background." However, to perform this task, the computer system, via an application, may need additional information such as how the user would like to change the background. In response, the computer system may generate an additional voice input request requesting the user to vocally provide an indication of how they would like to change the background. For example, an additional voice input request may be "how would you like to change the background?" The additional voice input request may be displayed to a user visually or may be in an audio format.

At 420, the computer system receives a second voice input. The second voice input may be audio initially generated by a user of the computer system. The user, via an audio input device, such as a microphone, may generate the second voice input. In one embodiment, the computer system or an external device may receive the second voice input and convert the second voice input into text.

At 425, the computer system modifies, based on the second voice input and operation x, one or more segments within an image. The computer system, via an application, may modify segments within an image. A segment may be a modifiable or operable portion of the image. For example, the background of an image may be a segment of the image. In such an example, the computer system may have generated an additional voice input request requesting the user to vocally provide an indication of how they would like to change the background. In response, a second voice input may be received of "remove the background." Based on this second voice input, the computer system may perform the task of layer masking the background, which visually removes the background from an image. In another embodiment, a first voice input may indicate to the computer system to brighten an image. The computer system may generate an additional voice input request. The additional voice input request may be generated after the completion of the task of brightening the image. In such an instance, the additional voice input request may be "how is this brightness?" In response, the computer system may receive a second voice input of "the image is too bright". The computer system may then perform one or more operations to reduce the brightness of the image. In one embodiment, the second voice input may invoke a separate set of operations than the first voice input. In the previous embodiment, the first voice input may have invoked the task of increasing the brightness in an image which may have first set of operations. However, the second voice input may have invoked the task of decreasing the brightness in an image which may have a second distinct set of operations.

At 430, the computer system increments operation x. The variable x is increased until all of the operations of the set of operations is completed. In one embodiment, each task may have an additional operation that requests an additional voice input request. For example, the task of "enhancing the contrast in an image" may require 5 operations. However, a $6^{th}$ operation may be added in order to request, from a user, the user's satisfaction with the operation. As a result, the operations associated with a particular task not only complete the particular task, but also ensure that the user is satisfied with the completed task.

Figure 5:
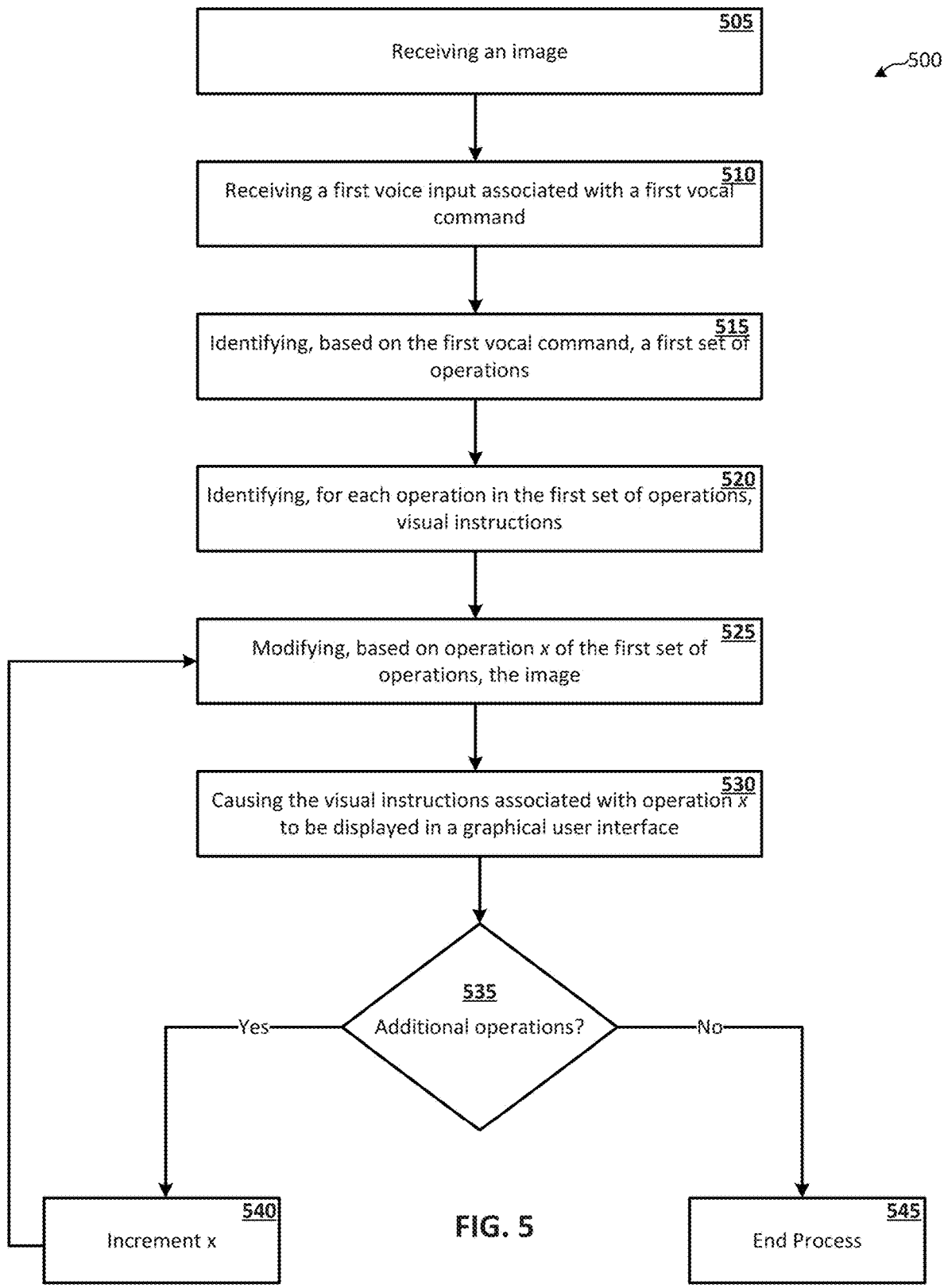
FIG. 5 illustrates an example process for implementing one or more embodiments described.

FIG. 5 illustrates process 500 for implementing one or more embodiments. Process 500 may be a process for displaying visual instructions associated with one or more operations in an operation set. Process 500 may be performed by a computer system. At 505, a computer system receives an image. The image may be in various formats. In one embodiment, the received image may also have associated image metadata. The image metadata may have information associated with the image. Upon receiving the image, the computer system may cause the received image to be displayed on an associated display. An associated display may be a display linked to the computer system or a display linked to a user device that is coupled, via an Internet or other suitable connection, to the computer system. In one embodiment, a photo editing application may be implemented by the computer system to display within a graphical user interface the received image.

At 510, the computer system receives a first voice input associated with a first vocal command. The first voice input may be audio initially generated by a user of the computer system. The user, via an audio input device, such as a microphone, may generate the first voice input. In one embodiment, the computer system or an external device may receive the first voice input and convert the first voice input into text. A vocal command may a task that may be completed based on a set of operations.

At 515, the computer system identifies, based on the first vocal command, a first set of operations. Each vocal command within the computer system may have a set of operations associated with it. These sets of operations may be a sequential ordering of operations that may be performed in order to complete a task. The operations within the set of operations may be required to be performed in sequential order or they may be performed in parallel. The operations may be performed by one or more applications being executed by the computer system.

At 520, the computer system identifies, for each operation in the first set of operations, visual instructions. The visual instructions may indicate how to manually perform an associated operation. In one embodiment, the visual instructions may provide a user an alternative to performing an associated operation or different ways to manually perform the associated operation. The visual instructions may be superimposed into a graphical user interface that is used to display the received image. In such an instance, the visual instructions may be seen by the user during the modification of the received image. The visual instructions may be stored within operating mappings within the computer system.

At 525, the computer system modifies, based on operation x of the first set of operations, the image. The computer system, via one or more applications, may modify the received image based on operation x of the first set of operations. The received image may be displayed, via a graphical user interface, prior and during the modification process. For example, the computer system may perform the first operation in the first set of operations which may cause a change to the received image within the graphical user interface. A couple of exemplary sets of operations may be seen in FIG. 2.

At 530, the computer system causes the visual instructions associated with operation x to be displayed within a graphical user interface. The visual instructions may, upon being displayed, within the graphical user interface, indicate how to manually perform an associated operation. For example, if operation x is selecting a particular icon to enter into a selection mode then the visual instructions associated with operation x may visually indicate an area within the graphical interface where the user can engage the particular icon in order to enter into a selection mode. In one embodiment, the received image and the visual instructions may be displayed during modifications to the received image. In one embodiment, only after the first set of operations are completed is the modified image displayed. In such an embodiment, the visual instructions associated with each operation in the first set of operations may be displayed in a step-by-step format, such that a user may walk through each operation within the first set of operations. In one example, the step-by-step format may allow a user to navigate visual instructions associated with each completed operation in the first set of operations instead of viewing associated virtual instructions as an associated operation is performed. In one embodiment, each visual instruction and operation associated with the visual instruction may be stored in an operation log.

At 535, the computer determines if there are additional operations. If there are additional operations in the first set of operations, then process 500 moves to 540 and variable x is incremented and process 500 returns to 525. However, if there are not additional operations, then process 500 moves to 545 and process 500 ends.

Process 500 may allow a user of the computer system to have visual indicators of how one or more operations are performed. In one embodiment, the set of operations associated with a task may be a result of a machine learning model associated with the computer system. The machine learning model may learn which operations to map to a particular task based on actions of previous users. In one embodiment, the previous users may be power or professional users of an application. Utilizing machine learning, the computer system may determine one or more sets of operations to complete a particular task and based on a user's previously determined skill set (e.g., a beginning user, a new user, an amateur user, and the like) implement a particular set of operations (and corresponding visual instructions) to perform a task. For example, there may be 3 ways to complete the task of removing the background of an image. However, each of these 3 ways may have a different associated difficulty level. If the user using the computer system is a new user then the computer system may utilize a first set of operations that may be a less complex way (e.g., easy) way to remove the background. However, if the user using the computer system is an advanced user then the computer system may utilize a third set of operations that may be an advanced way to remove the background. The difference between the first and third sets of operations may be that the third set contains one or more additional operations that modify one or more additional data points associated with the background such that the third set of operations may more finely tune or modify the background, whereas the first set of operations may remove the background in a more simplistic manner. By selecting a set of operations for a task that corresponds to a user's skill level, the computer system may aid in the accessibility of one or more applications.

Process 500 may be implemented for a group of images. For example, the processes performed in process 500 may be performed over a plurality of related images to modify or edit the plurality of images. For example, a plurality of related images may be images that are part of a panorama image or a High Dynamic Range (HDR). In such an example, a vocal command or voice input may be received that associates to the plurality of related images, such as, remove the background. Operations associated with the vocal command or voice input may be performed on one or more images within the plurality of related images in order to have an effect on the final image (e.g., panorama or HDR image).

Figure 6A:
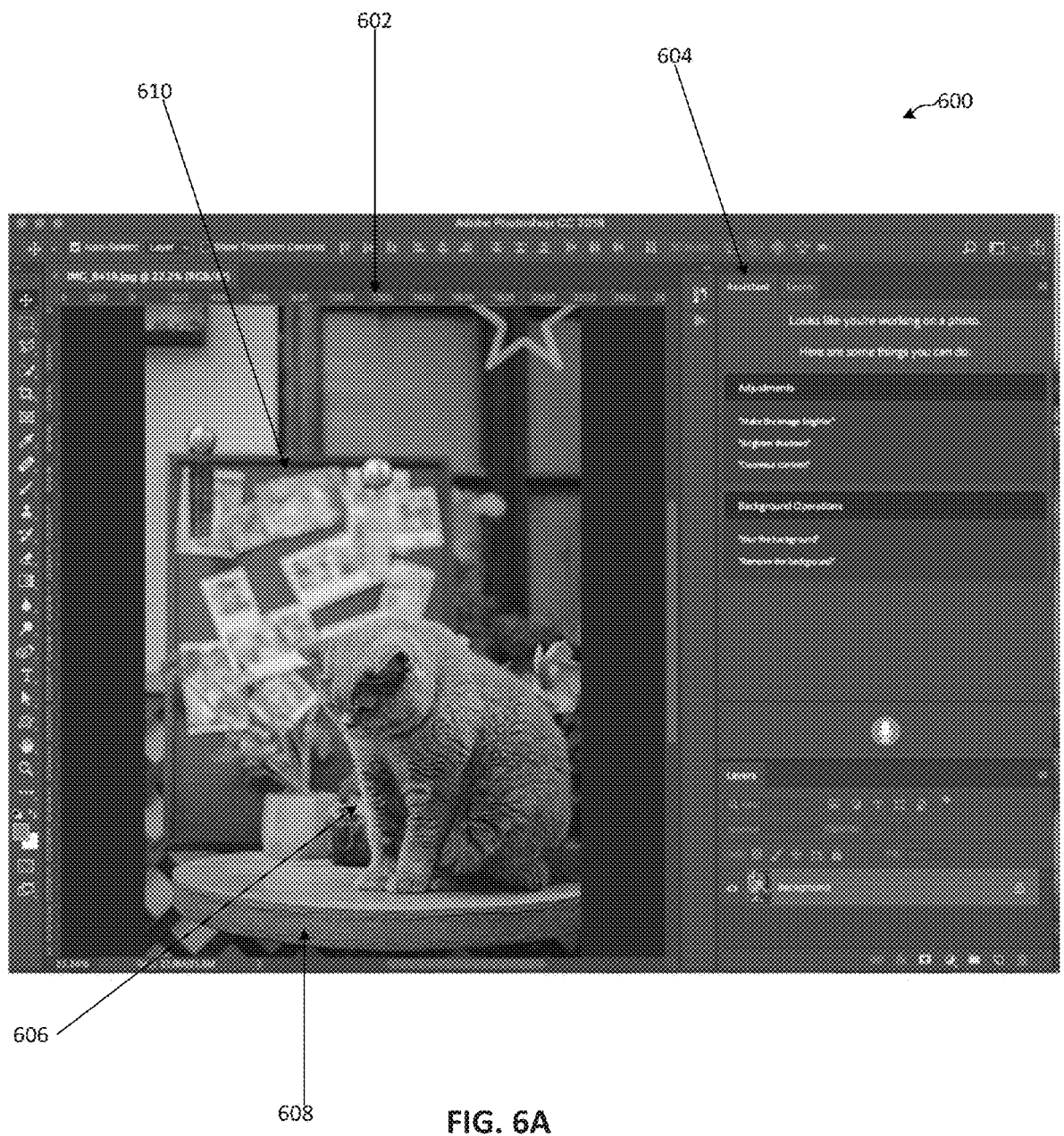
FIG. 6A illustrates a graphical user interface associated with one or more embodiments described.

FIGS. 6A-6I illustrate graphical user interface 600 in accordance to one or more embodiments. Graphical user interface 600 may be displayed via a display associated with a computer system or a user device in communication with a computer system. FIG. 6A illustrates graphical user interface 600 when an image is received by a computer system. FIG. 6A comprises image 602 and assistance interface 604. Image 602 may be part of visual data that is received by the computer system. Image 602 may comprise of one or more segments. For example, cat 606, table 608, and board 610 may all be segments within image 602. In addition, the background (e.g., everything except cat 606) may be a segment within image 602. Assistance interface 604 may include one or more voice input suggestions that may represent sample voice inputs. For example, assistance interface 604 has the voice input suggestions of "make the image brighter", "brighten shadows", "decrease contrast", "blur the background", and "remove the background." In one embodiment, each voice input suggestion may correspond to a voice command. In one embodiment, the voice input suggestions may be generated based at least on a user's previously determined skill set. In one embodiment, the voice input suggestions may be generated based on a user's past voice inputs. In one embodiment, different voice input suggestions may be generated based on different factors, such as, but not limited to, image type (e.g., landscape image, portrait image, etc.), aesthetic scores (e.g., exposure level, color composition), objects appearing in the given image (e.g., a cat in an image, a table in an image, flower in an image, a person in the image, etc.) In one embodiment, aesthetic scores may be based on a machine learning model that may take as an input exposure level, color composition, image size, saturation levels, lighting levels, shadow levels, and the like. The machine learning model may output an aesthetic score based on prior aesthetic scores indicated by users. In such an instance, the machine learning model may determine, based on various inputs and prior received aesthetic scores, an aesthetic score for an image. In one embodiment, voice input suggestions may be generated based on image information. Image information may comprise indications of segments within the image. In such an embodiment, a segment within an image may be a "sky" then a voice input suggestion may be based on a sky being in the image. For example, a voice input suggestion may be to "remove the sky" or "replace the sky." By utilizing information about an image, particular voice input suggestions may be generated.

Figure 6B:
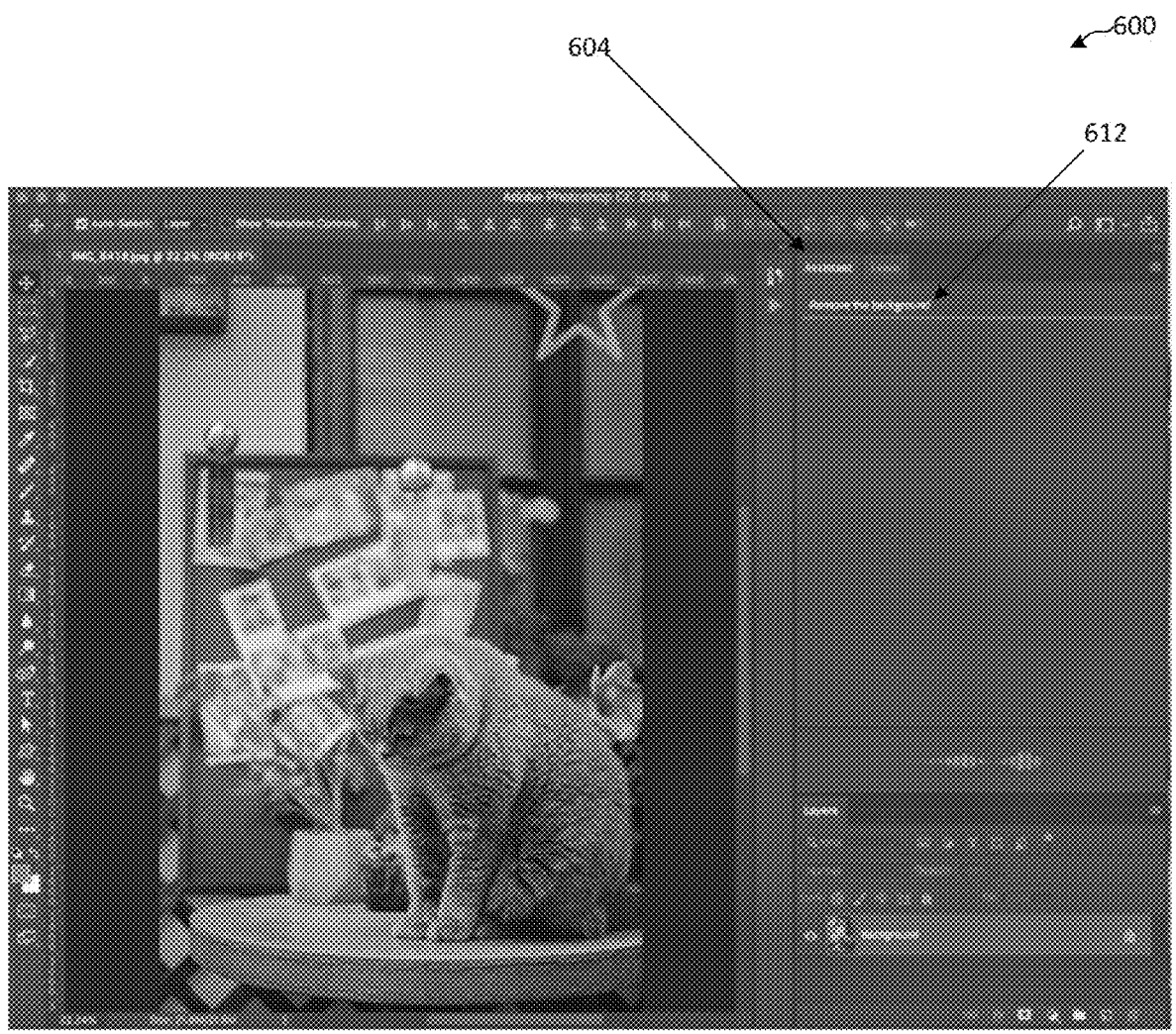
FIG. 6B illustrates a graphical user interface associated with one or more embodiments described.

FIG. 6B illustrates graphical user interface 600 when the computer system receives a voice input. Assistance interface 604 may indicate received voice input 612. Voice input 612 may be a voice input provided by a user of the computer system. By displaying voice input 612 a user of the computer system may identify the voice input received by the computer system.

Figure 6C:
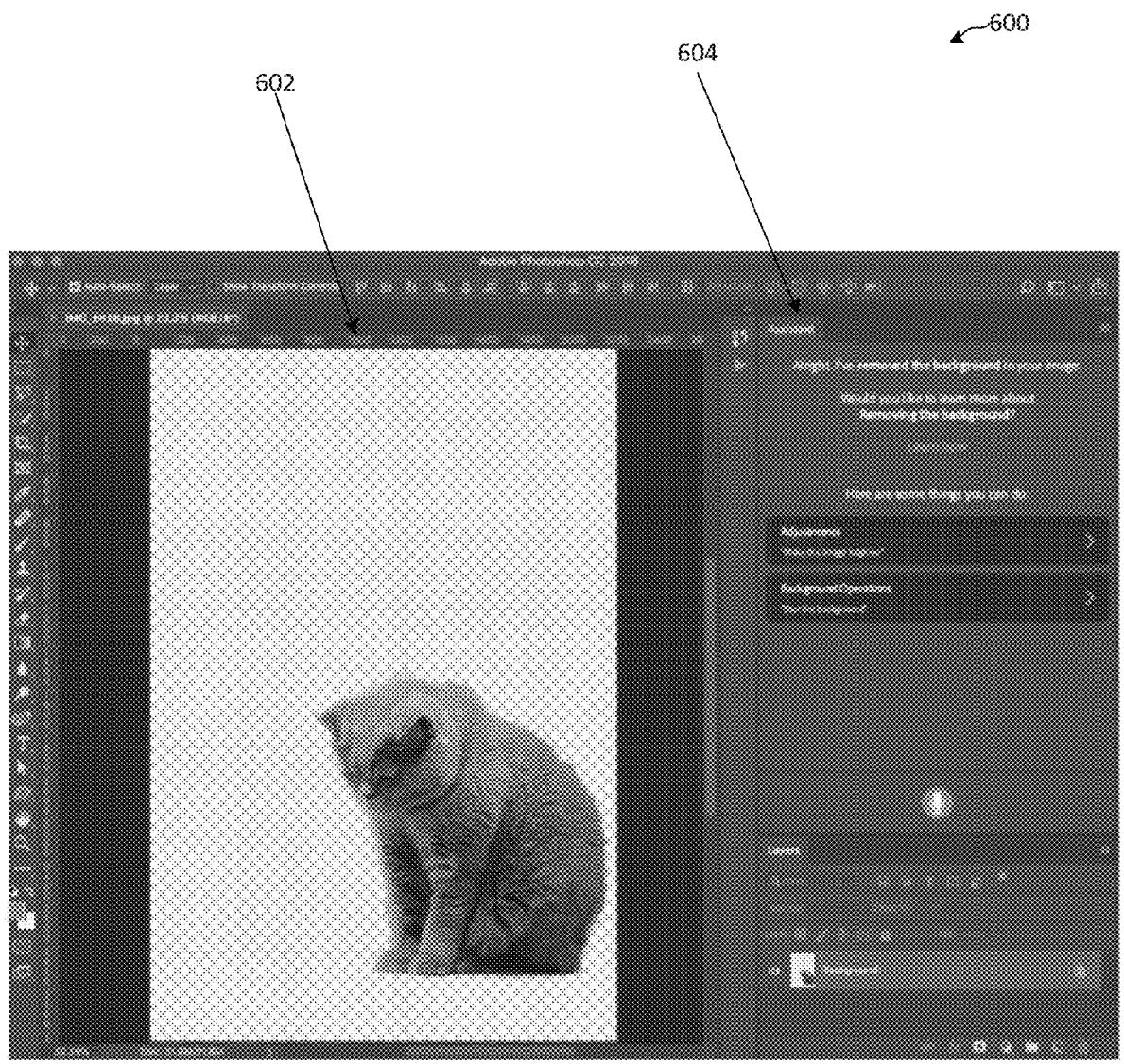
FIG. 6C illustrates a graphical user interface associated with one or more embodiments described.

FIG. 6C illustrates graphical user interface 600 when the computer system modifies the received image based on a voice input. In FIG. 6C the background has been removed from image 602. In addition, assistance interface 604 may display additional voice input suggestions. The additional voice input suggestions may be additional tasks that may be performed to further modify image 602.

Figure 6D:
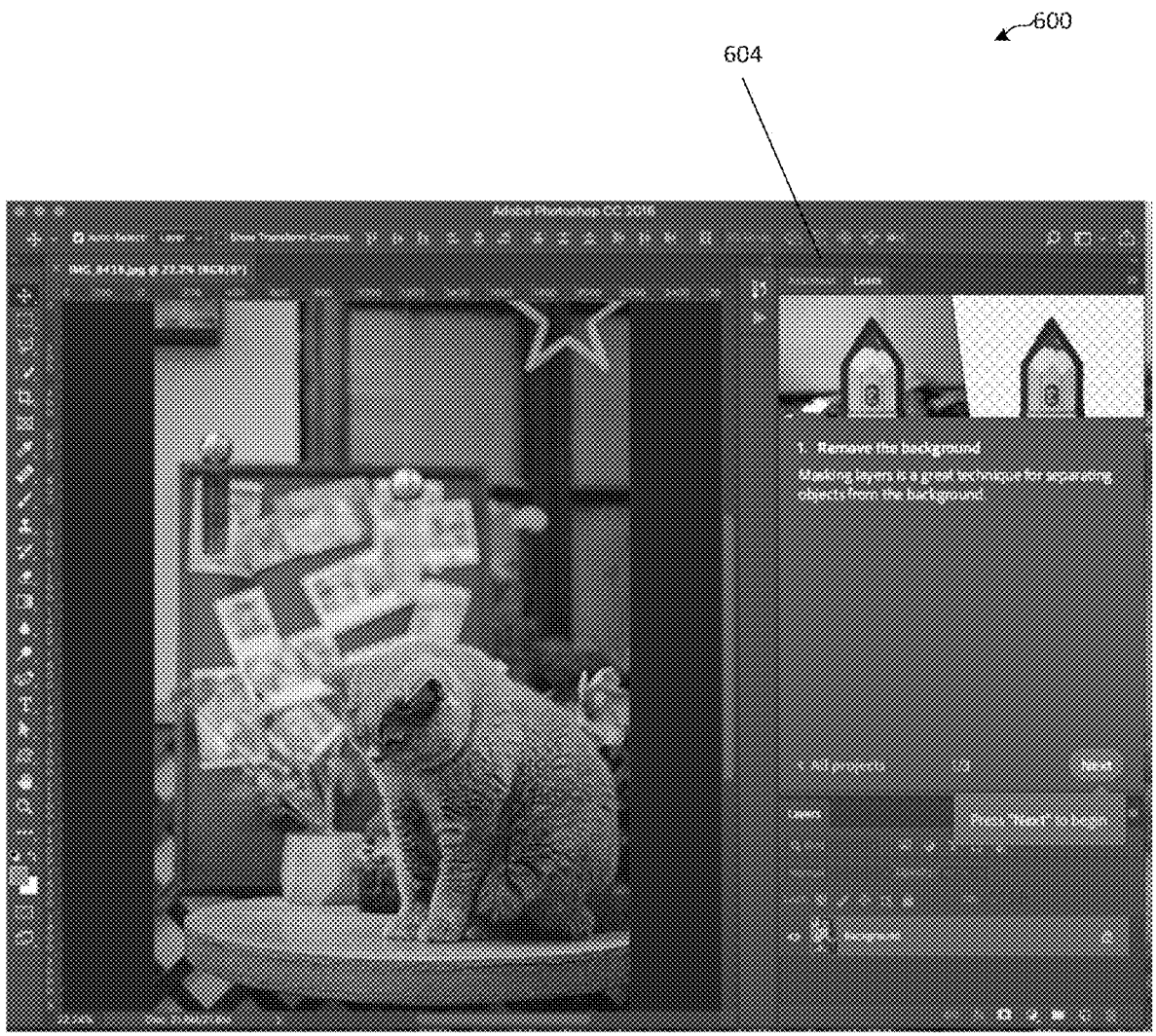
FIG. 6D illustrates a graphical user interface associated with one or more embodiments described.

FIG. 6D illustrates graphical user interface 600 when graphical user interface 600 displays one or more visual instructions associated with one or more operations. In FIG. 6D, assistance interface 604 may display visual instructions for a task. The task may be removing the background. Each task may have a plurality of associated operations that may be performed by the computer system to complete the task. Each task may be stored in an operation log.

In one embodiment, graphical user interface 600 as illustrated FIG. 6D may be displayed after the background of image 602 is removed (i.e. sequentially after FIG. 6C). In such an embodiment, the visual instructions may be displayed in a step-by-step format, such that a user may walk through each operation already performed by the computer system to modify the image. The user may navigate visual instructions associated with each operation performed by the computer system to modify the image instead of viewing virtual instructions associated with each operation that is currently being performed. In one embodiment, graphical user interface 600 as illustrated in FIG. 6D may be displayed after visual data (which contains image 602) is received (i.e. sequentially after FIG. 6A). In such an embodiment, the visual instructions may be displayed as each operation is being performed by the computer system to modify the image. The user may be able to see how to manually perform, in real time, operations performed by the computer system.

Figure 6E:
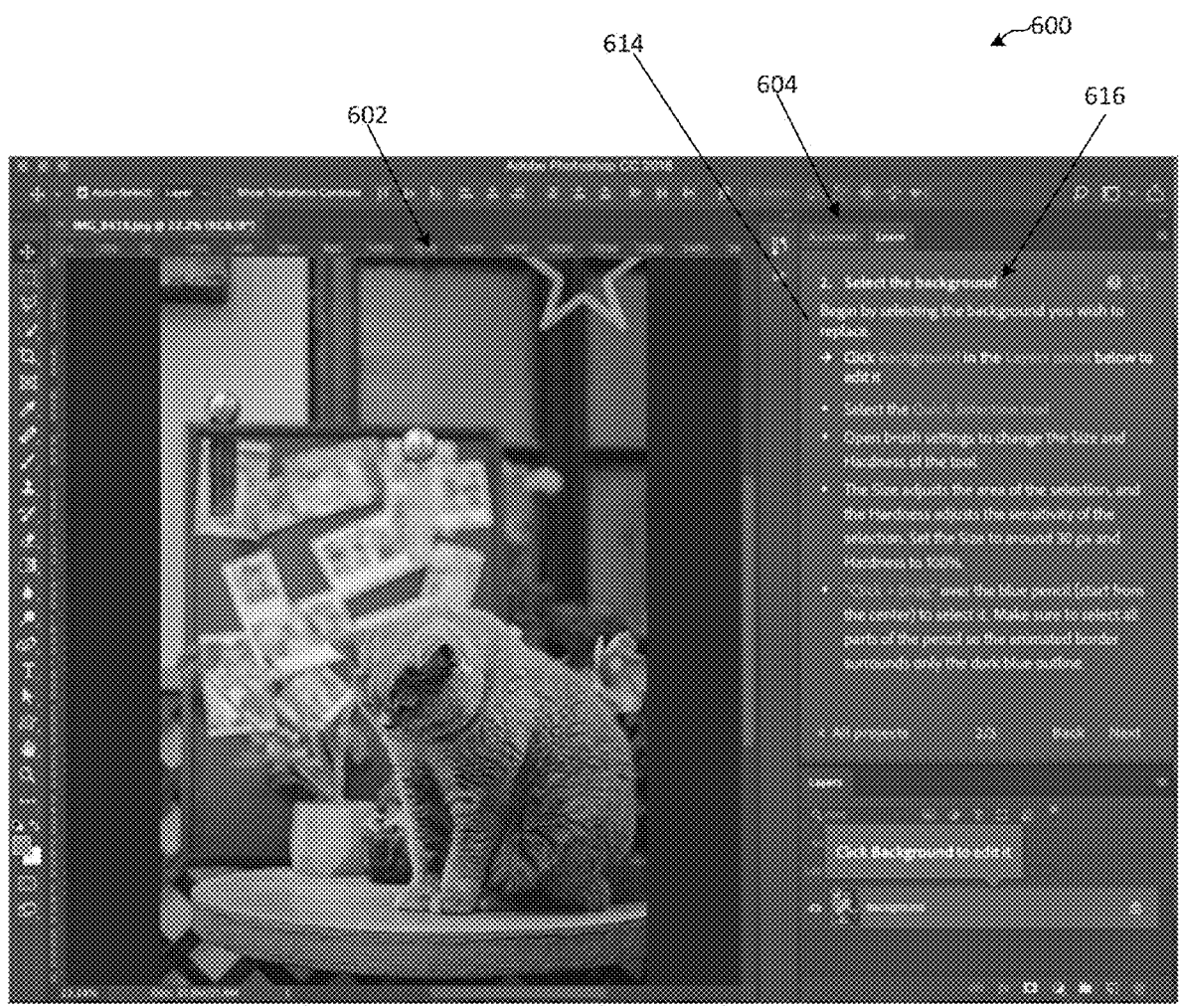
FIG. 6E illustrates a graphical user interface associated with one or more embodiments described.

FIG. 6E illustrates graphical user interface 600 displaying first visual instructions 614 associated with first operation 616. A shown in FIG. 6E, assistance interface 604 may comprise first visual instructions 614 that are associated with first operation 616. First operation 616 may be selecting the background of image 602. First visual instructions 614 indicated in assistance interface 604 may include one or more instructions on how to manually perform first operation 616. For example, a visual instruction may be the text "Click Background in the Layers panel below to edit it."

Figure 6F:
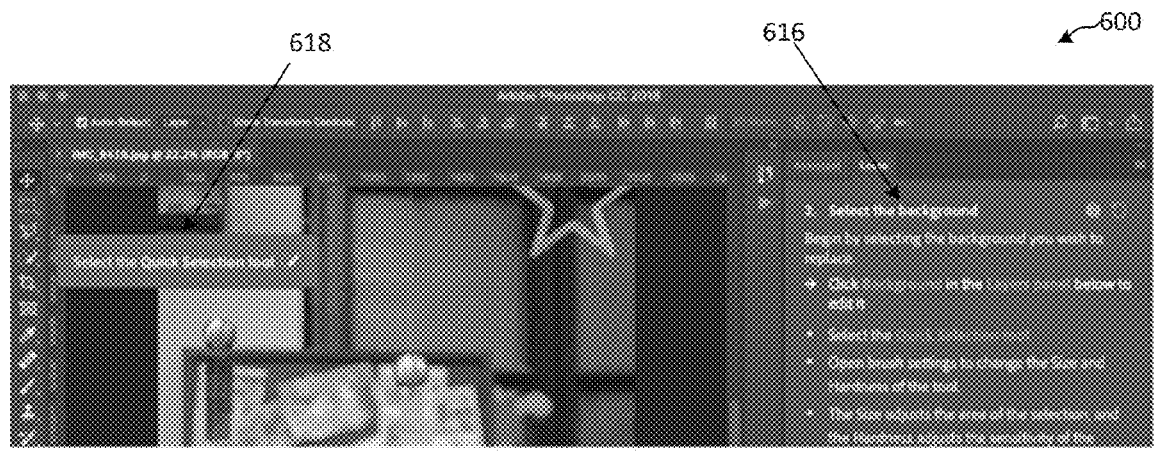
FIG. 6F illustrates a graphical user interface associated with one or more embodiments described.

FIG. 6F illustrates graphical user interface 600 displaying second visual instructions 618 associated with first operation 616. Second visual instructions 618 may be a visual indication that indicates where the quick selection tool is located within graphical user interface 600. In one embodiment, the quick selection tool may be a select subject tool, which when selected may automatically select salient objects in the image. Second visual instructions 618 may be utilized to manually perform first operation 616.

Figure 6G:
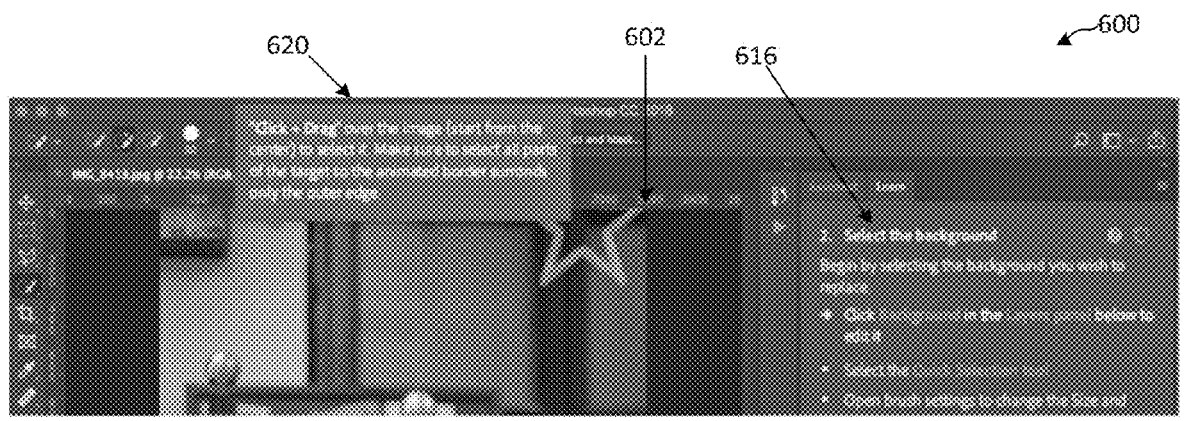
FIG. 6G illustrates a graphical user interface associated with one or more embodiments described.

FIG. 6G illustrates graphical user interface 600 displaying third visual instructions 620 associated with first operation 616. Third visual instructions 620 may be a visual indication that indicates how to select a segment within image 602. Third visual instructions 620 may indicate that in order to select a segment within image 602 a user may click and drag over a segment to select it. In instances, in which the quick selection tool is a select subject tool. Third visual instruction 620 may be indicate which segments within graphical user interface 600 are selected by the select subject process and how to modify which segments are selected by the select subject process.

Figure 6H:
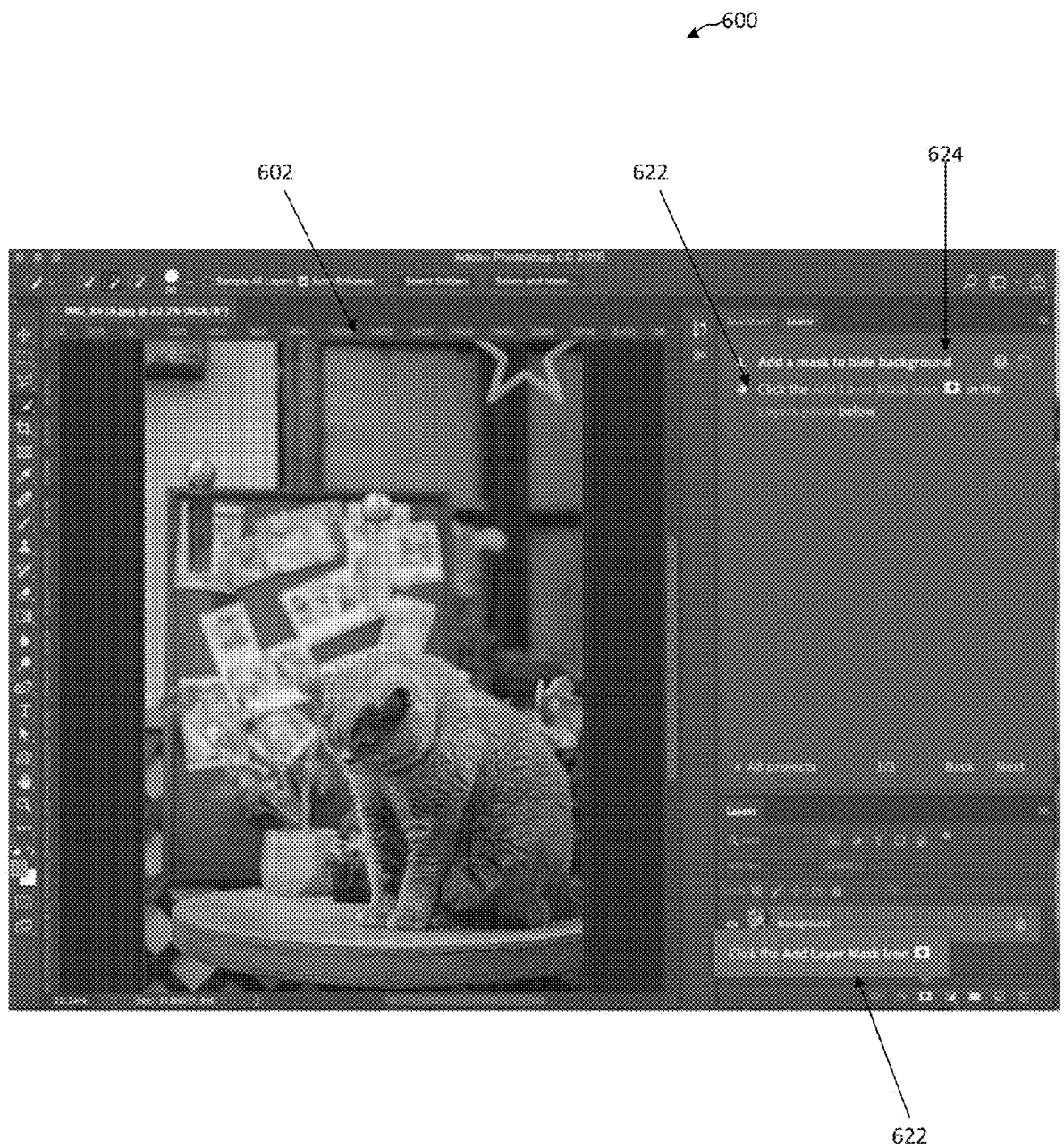
FIG. 6H illustrates a graphical user interface associated with one or more embodiments described.

FIG. 6H illustrates graphical user interface 600 displaying fourth visual instructions 622 associated with second operation 624. Second operation 624 may be adding a mask to image 602. Fourth visual instructions 622 may be a visual indication that indicates how to add a layer mask.

Figure 6I:
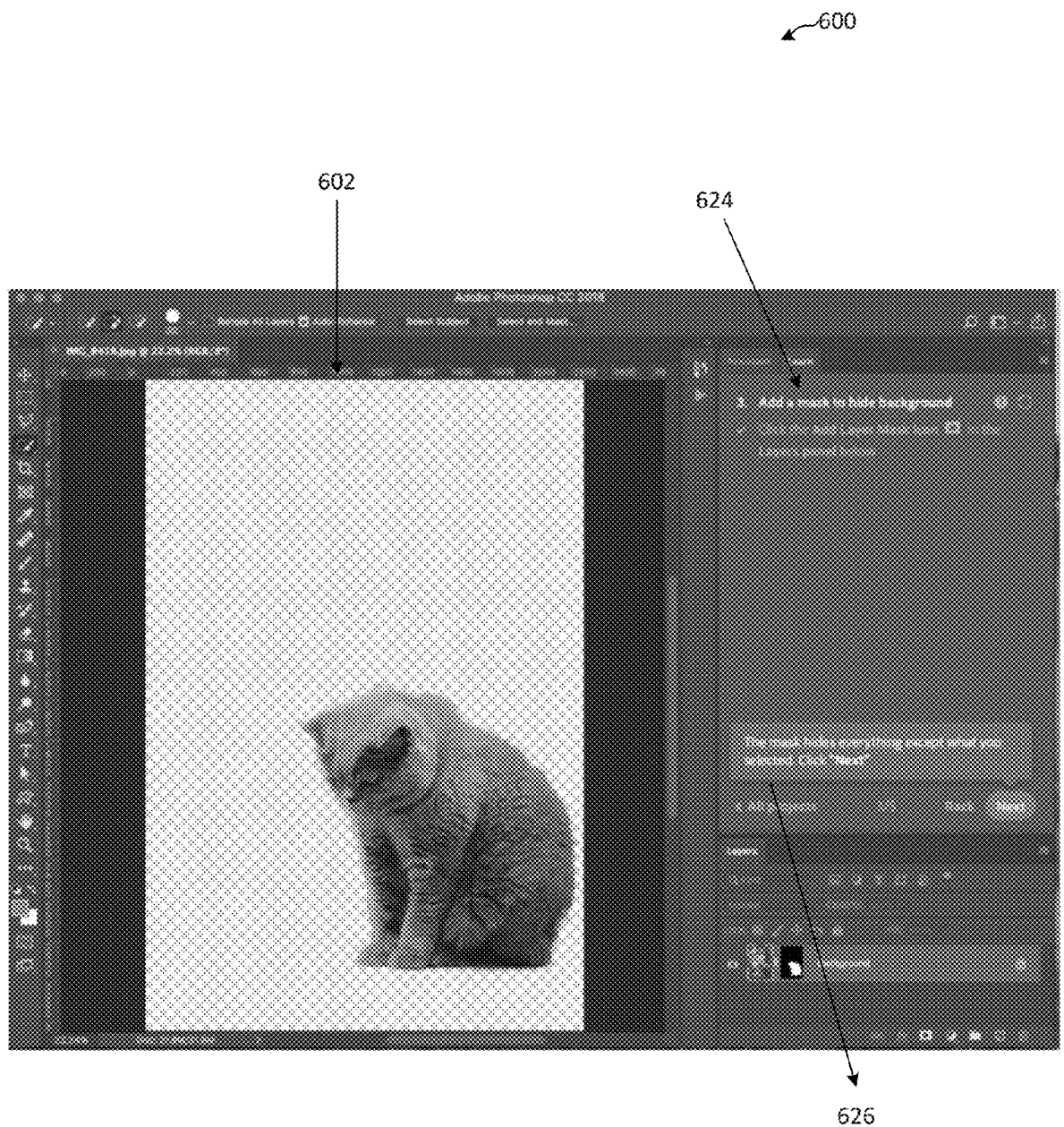
FIG. 6I illustrates a graphical user interface associated with one or more embodiments described.

FIG. 6I illustrates graphical user interface 600 displaying fifth visual instructions 626 associated with second operation 624. Fifth visual instructions 626 may be a visual indication that indicates what happens to image 602 when the mask is added to the image. Each of FIGS. 6A-6I may correspond to one or more embodiments.

Figure 7:
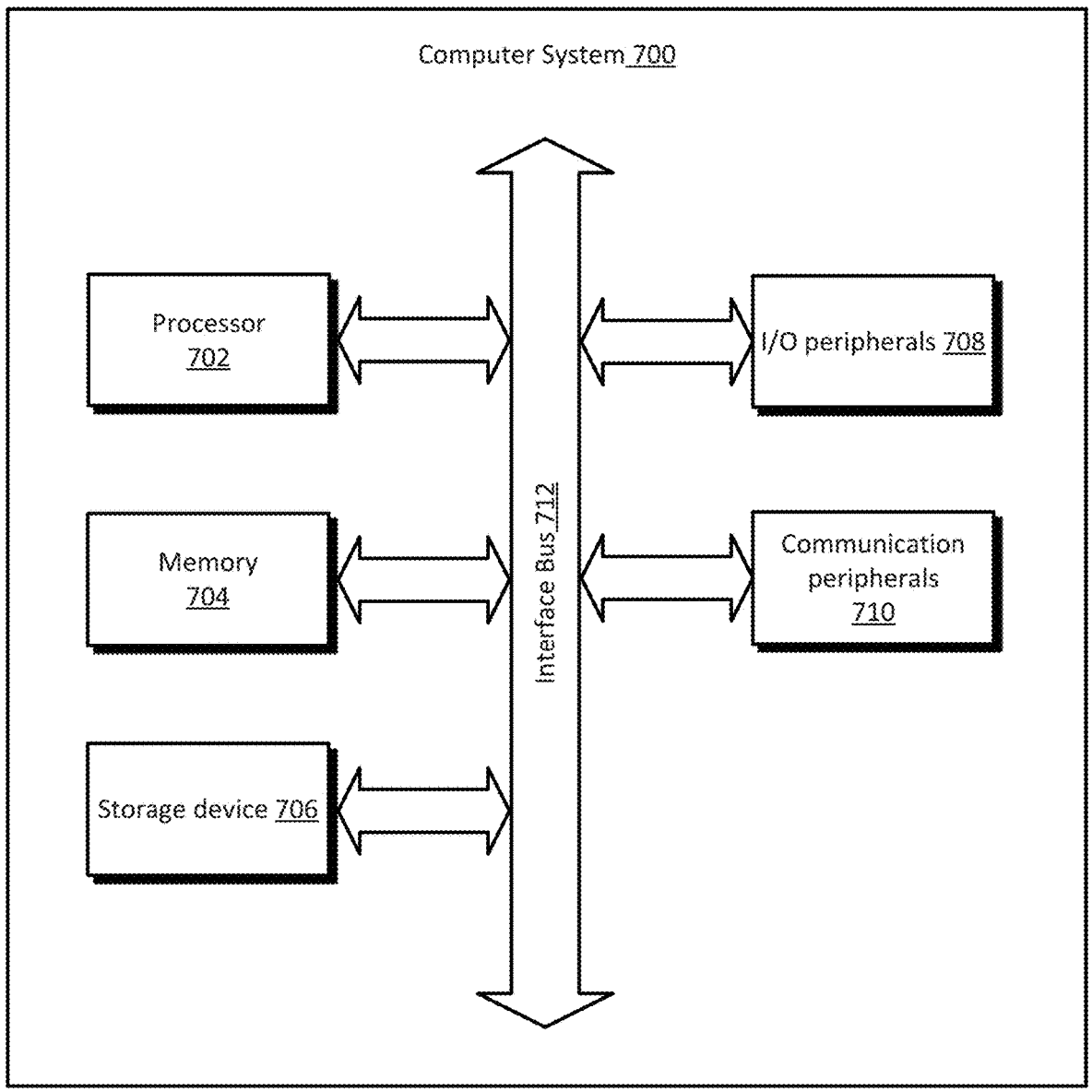
FIG. 7 illustrates an example computer system for implementing one or more embodiments described.

Any suitable computer system or group of computer systems can be used for performing the operations and processes described herein. For example, FIG. 7 depicts an example of the computer system 700. The implementation of computer system 700 could be used to perform one or more parts of processes 300, 400 and/or 500. Computer system 102 in FIG. 1 may be implemented by computer system 700.

The depicted example of a computer system 700 includes a processor 702 communicatively coupled to one or more memory devices 704. The processor 702 executes computer-executable program code stored in a memory device 704, accesses information stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices, including a single processing device.

A memory device 704 includes any suitable non-transitory computer-readable medium for storing program code or program data. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

A storage device 706 includes additional storage for computer system 700. In one embodiment, storage device 706 may be implemented by a hard drive disk and/or a steady state drive. In one embodiment, storage device 706 may store one or more sets of operations mapping and machine learning models.

The computer system 700 may also include a number of external or internal devices, such as a monitor, keyboard, mouse, or other input or output devices. For example, computer system 700 is shown with one or more input/output ("I/O") peripheral 708. An I/O peripheral 708 can receive input from input devices or provide output to output devices. One or more buses 712 are also included in the computer system 700. The bus 712 communicatively couples one or more components of a respective one of the computer system 700.

In some embodiments, the computer system 700 also includes network communications peripherals 710. The network communications peripherals 710 include any device or group of devices suitable for establishing a wired or wireless data connection to one or more data networks. Non-limiting examples of the network communications peripherals 710 include an Ethernet network adapter, a modem, and/or the like. The computer system 700 is able to communicate with one or more other computer devices via a data network using network communications peripherals 710. For example, computer system 700 may receive one or more source images and/or target images via network communications peripherals 710.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computer," "calculating," "determining," and "identifying" or the like refer to actions or processes of a computer device, such as one or more computers or a similar electronic computer device or devices, that manipulate or transform data represented as physical electronic or magnetic quantities within memories, registers, or other information storage devices, transmission devices, or display devices of the computer platform.

The system or systems discussed herein are not limited to any particular hardware architecture or configuration. A computer device can include any suitable arrangement of components that provide a result conditioned on one or more inputs. Suitable computer devices include multi-purpose microprocessor-based computer systems accessing stored software that programs or configures the computer system from a general-purpose computer apparatus to a specialized computer apparatus implementing one or more embodiments of the present subject matter. Any suitable programming, scripting, or other type of language or combinations of languages may be used to implement the teachings contained herein in software to be used in programming or configuring a computer device.

Embodiments of the methods disclosed herein may be performed in the operation of such computer devices. The order of the blocks presented in the examples above can be varied—for example, blocks can be re-ordered, combined, and/or broken into sub-blocks. Certain blocks or processes can be performed in parallel.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A computer-implemented method for editing an image based on voice interaction comprising:
    receiving an image using a photo editing application;
    identifying a first label for a first segment within the image and a second label for a second segment within the image, wherein the first segment and the second segment are operable portions of the image;
    receiving a voice input of a user;
    matching (a) a first portion of the voice input to the first label and not to the second label and (b) a second portion of the voice input to a vocal command;
    identifying, based on the vocal command, a particular set of operations for modifying within the image, wherein the particular set of operations is previously mapped to the vocal command, wherein the particular set of operations comprises a plurality of sequential operations, wherein identifying the particular set of operations comprises:
        determining a skill level of the user from a set of skill levels;
        using a machine learning model, determining one or more sets of operations, each of the one or more sets of operations corresponding to a respective skill level of the set of skill levels; and
        using the machine learning model, selecting the particular set of operations from the one or more sets of operations;
    applying the particular set of operations to the first segment and not to the second segment to generate a modified image, wherein applying the particular set of operations to the first segment comprises:
        identifying a first operation of the particular set of operations;
        executing the first operation of the particular set of operations;
        while executing the first operation of the particular set of operations, causing a first visual instruction associated with the first operation to be displayed in a graphical user interface, the first visual instruction including a visual indicator that instructs the user how to manually perform the first operation; and
    causing the modified image to be displayed in the graphical user interface.

2. The computer-implemented method of claim 1, further comprising:
    receiving a subsequent voice input;
    determining, based on the subsequent voice input, a subsequent vocal command;
    identifying, based on the subsequent vocal command, a subsequent set of operations for modifying one or more segments within the image; and
    modifying, based on the subsequent set of operations, the one or more segments within the modified image, wherein the particular set of operations and the subsequent set of operations modify at least a common segment within the image.

3. The computer-implemented method of claim 1, further comprising:
    storing, in an operation log, each completed operation of the particular set of operations; and
    causing the operation log to be displayed in the graphical user interface.

4. The computer-implemented method of claim 1, wherein the particular set of operations comprises the first operation, a second operation, and a third operation, wherein:
    the first operation comprises instructions for identifying, within the image, a first object and a first location of the first object within the image;
    the second operation comprises instructions for removing the first object from the first location; and
    the third operation comprises instructions for modifying the first location based at least on a background within the image, wherein the background is a segment of the image.

5. The computer-implemented method of claim 4, wherein the particular set of operations further comprises a fourth operation, wherein the fourth operation comprises instructions for placing the first object at a second location, wherein the second location is based on the vocal command.

6. The computer-implemented method of claim 1, wherein applying the particular set of operations to the first segment further comprises:
    identifying a second operation of the particular set of operations, the second operation being sequentially after the first operation;
    executing the second operation of the particular set of operations;
    while executing the second operation of the particular set of operations, causing a second visual instruction associated with the second operation to be displayed in the graphical user interface, the second visual instruction comprising visual indicators that instruct the user how to manually perform the second operation.

7. A non-transitory computer-readable storage medium having stored thereon instructions for causing at least one computer system to edit an image based on voice interaction, the instructions comprising:
    receiving an image using a photo editing application;
    identifying a first label for a first segment within the image and a second label for a second segment within the image, wherein the first segment and the second segment are operable portions of the image;
    receiving a voice input of a user;
    matching (a) a first portion of the voice input to the first label and not to the second label and (b) a second portion of the voice input to a vocal command;

identifying, based on the vocal command, a particular set of operations for modifying within the image, wherein the particular set of operations is previously mapped to the vocal command, wherein the particular set of operations comprises a plurality of sequential operations, wherein identifying the particular set of operations comprises:
  determining a skill level of the user from a set of skill levels;
  using a machine learning model, determining one or more sets of operations, each of the one or more sets of operations corresponding to a respective skill level of the set of skill levels:
  using the machine learning model, selecting the particular set of operations from the one or more sets of operations;
applying the particular set of operations to the first segment and not to the second segment to generate a modified image, wherein applying the set of operations to the first segment comprises:
  identifying a first operation of the particular set of operations;
  executing the first operation of the particular set of operations;
  while executing the first operation of the particular set of operations, causing a first visual instruction associated with the first operation to be displayed in a graphical user interface, the first visual instruction including a visual indicator that instructs the user how to manually perform the first operation; and
causing the modified image to be displayed in the graphical user interface.

8. The computer-readable storage medium of claim 7, the instructions further comprising:
  receiving a subsequent voice input;
  determining, based on the subsequent voice input, a subsequent vocal command;
  identifying, based on the subsequent vocal command, a subsequent set of operations for modifying one or more segments within the image; and
  modifying, based on the subsequent set of operations, the one or more segments within the modified image, wherein the particular set of operations and the subsequent set of operations modify at least a common segment within the image.

9. The computer-readable storage medium of claim 7, the instructions further comprising:
  storing, in an operation log, each completed operation of the particular set of operations; and
  causing the operation log to be displayed in the graphical user interface.

10. The computer-readable storage medium of claim 7, wherein the particular set of operations comprises the first operation, a second operation, and a third operation, wherein:
  the first operation comprises instructions for identifying, within the image, a first object and a first location of the first object;
  the second operation comprises instructions for removing the first object from the first location; and
  the third operation comprises instructions for modifying the first location based at least on a background within the image, wherein the background is a segment of the image.

11. The computer-readable storage medium of claim 10, wherein the particular set of operations further comprises a fourth operation, wherein the fourth operation comprises instructions for placing the first object at a second location, wherein the second location is based on the vocal command.

12. The computer-readable storage medium of claim 7, wherein applying the particular set of operations to the first segment further comprises:
  identifying a second operation of the set of operations, the second operation being sequentially after the first operation;
  executing the second operation of the particular set of operations;
  while executing the second operation of the particular set of operations, causing a second visual instruction associated with the second operation to be displayed in the graphical user interface, the second visual instruction comprising visual indicators that instruct the user how to manually perform the second operation.

13. A system for editing an image based on voice interaction, comprising:
  one or more processors; and
  a memory coupled with the one or more processors, the memory configured to store instructions that when executed by the one or more processors cause the one or more processors to:
    receive an image using a photo editing application;
    identify a first label for a first segment within the image and a second label for a second segment within the image, wherein the first segment and the second segment are operable portions of the image;
    receive a voice input of a user;
    match (a) a first portion of the voice input to the first label and not to the second label and (b) a second portion of the voice input to a vocal command;
  identify, based on the vocal command, a particular set of operations for modifying within the image, wherein the particular set of operations is previously mapped to the vocal command, wherein the particular set of operations comprises a plurality of sequential operations, wherein identifying the particular set of operations comprises:
    determining a skill level of the user from a set of skill levels;
    using a machine learning model, determining one or more sets of operations, each of the one or more sets of operations corresponding to a respective skill level of the set of skill levels; and
    using the machine learning model, selecting the particular set of operations from the one or more sets of operations;
  apply the particular set of operations to the first segment and not to the second segment to generate a modified image, wherein applying the particular set of operations to the first segment comprises:
    identifying a first operation of the particular set of operations;
    executing the first operation of the particular set of operations;
    while executing the first operation of the particular set of operations, causing a first visual instruction associated with the first operation to be displayed in a graphical user interface, the first visual instruction including a visual indicator that instructs the user how to manually perform the first operation; and
  cause the modified image to be displayed in the graphical user interface.

14. The system of claim 13, wherein the instructions that when executed by the one or processors further cause the one or more processors to:
- receive a subsequent voice input;
- determine, based on the subsequent voice input, a subsequent vocal command;
- identify, based on the subsequent vocal command, a subsequent set of operations for modifying one or more segments within the image; and
- modify, based on the subsequent set of operations, the one or more segments within the modified image, wherein the particular set of operations and the subsequent set of operations modify at least a common segment within the image.

15. The system of claim 13, wherein the instructions that when executed by the one or processors further cause the one or more processors to:
- store, in an operation log, each completed operation of the particular set of operations; and
- cause the operation log to be displayed in the graphical user interface.

16. The system of claim 13, wherein the particular set of operations comprises the first operation, a second operation, and a third operation, wherein:
- the first operation comprises instructions for identifying within the image, a first object and a first location of the first object;
- the second operation comprises instructions for removing the first object from the first location; and
- the third operation comprises instructions for modifying the first location based at least on a background within the image, wherein the background is a segment of the image.

17. The system of claim 16, wherein the particular set of operations further comprises a fourth operation, wherein the fourth operation operations comprises instructions for placing the first object at a second location, wherein the second location is based on the vocal command.

18. The system of claim 13, wherein applying the particular set of operations to the first segment further comprises:
- identify a second operation of the particular set of operations, the second operation being sequentially after the first operation;
- executing the second operation of the particular set of operations;
- while executing the second operation of the particular set of operations, causing a second visual instruction associated with the second operation to be displayed in the graphical user interface, the second visual instruction comprising visual indicators that instruct the user how to manually perform the second operation.

19. The computer-implemented method of claim 1, wherein the visual indicator is displayed at a location of the graphical user interface corresponding to an icon, wherein the user manually performs the first operation by selecting the icon.

20. The system of claim 13, wherein the visual indicator is displayed at a location of the graphical user interface corresponding to an icon, wherein the user manually performs the first operation by selecting the icon.

* * * * *